(12) United States Patent
Fernholz et al.

(10) Patent No.: US 8,143,204 B2
(45) Date of Patent: Mar. 27, 2012

(54) MG++ CHEMISTRY AND METHOD FOR FOULING INHIBITION IN HEAT PROCESSING OF LIQUID FOODS AND INDUSTRIAL PROCESSES

(75) Inventors: Peter J. Fernholz, Burnsville, MN (US); John W. Bolduc, Eagan, MN (US); Paul F. Schacht, Oakdale, MN (US); Michael E. Besse, Golden Valley, MN (US); Anthony W. Erickson, Golden Valley, MN (US)

(73) Assignee: Ecolab USA Inc., St. Paul, MN (US)

( * ) Notice: Subject to any disclaimer, the term of this patent is extended or adjusted under 35 U.S.C. 154(b) by 140 days.

(21) Appl. No.: 12/114,428

(22) Filed: May 2, 2008

(65) Prior Publication Data

US 2008/0274933 A1    Nov. 6, 2008

Related U.S. Application Data

(60) Provisional application No. 60/927,575, filed on May 4, 2007.

(51) Int. Cl.
*C23F 11/06* (2006.01)
(52) U.S. Cl. ............ 510/218; 422/13; 422/18; 426/321; 426/323; 99/483
(58) Field of Classification Search .................. 510/218; 422/13, 18; 426/321, 323; 99/438
See application file for complete search history.

(56) References Cited

U.S. PATENT DOCUMENTS

| | | | |
|---|---|---|---|
| 2,872,414 A | | 2/1959 | Gray |
| 4,207,183 A | | 6/1980 | Herrigel |
| 4,452,703 A | | 6/1984 | Ralston et al. |
| 4,711,725 A | | 12/1987 | Amick et al. |
| 4,818,795 A | | 4/1989 | Denzinger et al. |
| 4,886,859 A | | 12/1989 | Denzinger et al. |
| 4,935,065 A | | 6/1990 | Bull |
| 5,039,441 A | | 8/1991 | Thomas et al. |
| 5,053,161 A | | 10/1991 | Sprague |
| 5,182,028 A | | 1/1993 | Boffardi et al. |
| 5,580,592 A | | 12/1996 | Nassauer et al. |
| 5,821,211 A | | 10/1998 | Borah |
| 5,863,877 A | * | 1/1999 | Carr et al. ............ 510/348 |
| 6,133,227 A | * | 10/2000 | Barnabas et al. ............ 510/530 |
| 6,365,101 B1 | * | 4/2002 | Nguyen et al. ............ 422/13 |
| 6,506,258 B1 | | 1/2003 | Berends et al. |
| 6,699,684 B2 | | 3/2004 | Ho et al. |
| 7,048,803 B2 | | 5/2006 | Williams |
| 7,445,014 B2 | * | 11/2008 | Sakane et al. ............ 134/58 D |
| 2004/0188262 A1 | | 9/2004 | Heimann et al. |
| 2006/0042665 A1 | * | 3/2006 | Fernholz et al. ............ 134/42 |
| 2006/0118761 A1 | | 6/2006 | Stapp |
| 2006/0278217 A1 | | 12/2006 | Theoleyre |
| 2008/0105282 A1 | * | 5/2008 | Fernholz et al. ............ 134/26 |

FOREIGN PATENT DOCUMENTS

| | | |
|---|---|---|
| EP | 633226 | 4/1998 |
| JP | 1991-167382 | 7/1991 |
| JP | 2000-070993 | 3/2000 |
| JP | 2003-525104 | 8/2003 |
| KR | 1019810000367 | 4/1981 |
| WO | WO2005/118488 | 12/2005 |

OTHER PUBLICATIONS

Chen, Tao et al. "Assessing the effect of Mg2+ on CaCO3 scale formation—bulk precipitation and surface deposition", Journal of Crystal Growth (2005), 275(1-2), ISSN: 0022-0248.
Doherty, William O.S., "Effect of Calcium and Magnesium Ions on Calcium Oxalate Formation in Sugar Solutions", Ind. Eng. Chem. Res. 2006, 45, pp. 642-647, 6 pages.
Dove, Patricia M. et al. "Inhibition of CaCO3 crystallization by small molecules: The magnesium example", Nanoscale Structure and Assembly at Solid-Fluid Interface (2004), vol. 2, 55-82. ISBN: 1-4020-7810-2.
Hasson, David et al. "Inhibition of CaCO3 scale deposition by trace concentrations of some common ions", Proceedings—Water Quality Technology Conference and Exhibition (2004) ISSN: 0164-0755.
Linnikov, O.D. et al. "Inhibition of scale formation from natural salt waters. Inhibitor effect on chemical composition of the forming scale", Desalination (1991), 82(1-3), 359-63, ISSN: 0011-9164.
Pszczola, D.E., Food Technology Journal Article, 2005, 59 (12) 65-66, 68, 70-72, 74-75, ISSN: 0015-6639.

* cited by examiner

*Primary Examiner* — Milton I Cano
*Assistant Examiner* — Mohammad Asdjodi
(74) *Attorney, Agent, or Firm* — Andrew D. Sorensen; Laura C. DiLorenzo

(57) ABSTRACT

The present invention relates to methods for removing or preventing scale formation in a liquid food processing operation. Aqueous antiscalant solutions comprising soluble magnesium salts are used to prevent the precipitation of insoluble calcium salts and/or to increase the solubility of insoluble calcium salts.

8 Claims, 5 Drawing Sheets

MG++ CHEMISTRY AND METHOD FOR FOULING INHIBITION IN HEAT PROCESSING OF LIQUID FOODS AND INDUSTRIAL PROCESSES

CROSS-REFERENCE TO RELATED APPLICATIONS

This application claims priority and is related to U.S. Provisional Application Ser. No. 60/927,575 filed on May 4, 2007 and entitled "Compositions Containing Magnesium Salts and Methods of Using." The entire contents of this patent application are hereby expressly incorporated herein by reference including, without limitation, the specification, claims, and abstract, as well as any figures, tables, or drawings thereof.

This application is also related to: U.S. patent application Ser. No. 12/114,486, entitled "Cleaning Compositions with Water Insoluble Conversion Agents and Methods of Making and Using Them"; U.S. patent application Ser. No. 12/114,355, entitled, "Composition For In Situ Manufacture Of Insoluble Hydroxide When Cleaning Hard Surfaces And For Use In Automatic Warewashing Machines, And Methods For Manufacturing And Using"; U.S. patent application Ser. No. 12/114,448, entitled "Water Treatment System and Downstream Cleaning Methods"; U.S. patent application Ser. No. 12/114,327, entitled "Water Soluble Magnesium Compounds as Cleaning Agents and Methods of Using Them"; U.S. patent application Ser. No. 12/114,513, now U.S. Pat. No. 7,749,329 entitled "Cleaning Compositions Containing Water Soluble Magnesium Compounds and Methods of Using Them"; U.S. patent application Ser. No. 12/114,329, now U.S. Pat. No. 7,709,434 entitled "Compositions Including Hardness Ion and Gluconate and Methods Employing Them to Reduce Corrosion and Etch"; U.S. patent application Ser. No. 12/114,342, now U.S. Pat. No. 7,960,329 entitled "Compositions Including Hardness Ion and Silicate and Methods Employing Them to Reduce Corrosion and Etch"; U.S. patent application Ser. No. 12/114,364, entitled "Compositions Including Hardness Ion and Threshold Agent and Methods Employing Them to Reduce Corrosion and Etch"; and U.S. patent application Ser. No. 12/114,385, now U.S. Pat. No. 8,021,493 entitled "Warewashing Compositions for Use in Automatic Dishwashing Machines and Method for Using", all commonly assigned to Ecolab, Inc., are filed on the same date as this application being May 2, 2008 and are all incorporated herein by reference for all purposes.

FIELD OF THE INVENTION

The present invention relates generally to the field of removing or preventing scale formation in a food processing operation. In particular, the present invention is related to a method of preventing the precipitation of calcium salts and/or increasing the solubility of calcium salts in a food processing operation.

BACKGROUND

The formation of calcium salt scales such as calcium phosphate, calcium oxalate, calcium carbonate, and calcium silicate, during liquid food processing is a significant problem for the food and beverage industry, particularly for breweries, vegetable juice processors, and evaporators in food processing plants. Exemplary liquid food streams that require processing include, but are not limited to: milk, whey, whey permeate, fruit and vegetable juices, calcium fortified beverages, sugar, corn wet milling steeping liquor, and fuel ethanol process streams from corn, sugar, or other biomass conversions. In particular, calcium phosphate may form during the processing of milk, and calcium oxalate may form during the processing of sugar, spinach, and other juices.

The formation of the calcium salt scales on the surface of the processing equipment causes scaling or fouling of the system, decreasing the flow rate and the run-time of the process. Various stages of food processing operations involve concentrating liquid food process streams, such as during evaporation, filtration, or pasteurization. Typically, scaling of the equipment occurs during heat exchange stages, such as the evaporation stage and the ultra high temperature (UHT) stage of food processing operations. The heat facilitates the formation and deposition of calcium salts on the surfaces of the equipment, decreasing the flow rate and run time of the equipment. For example, during the UHT stage, the liquids are pasteurized at temperatures of around about 146 degrees Celsius as the liquid goes through the tube.

Current methods for removing the calcium salts deposited on the surface of the equipment typically involve using the alkaline salt of ethylene diamine triacetic acid (EDTA), a biodegradable chelant, or strong solutions of nitric acid, phosphoric acid, or sulfuric acid. In the case of calcium oxalate, hydrochloric acid and hydrofluoric acid may be used. The solutions are used to dissolve the calcium salts in order to remove the scaling from the surface of the equipment. The equipment is cleaned daily with the calcium salts being removed during an acid rinse cycle.

SUMMARY

In some aspects, the present invention provides a method for preventing scale formation on industrial food processing equipment used to process a liquid food source. In some embodiments, the method comprises applying an antiscalant aqueous solution comprising a water soluble source of magnesium ion to the equipment, wherein the antiscalant solution is applied to the equipment by at least one of direct injection into the liquid food source prior to evaporation and direct injection in the process lines of the equipment prior to evaporation, such that the formation of scale on the equipment is substantially prevented.

In some embodiments, the water soluble source of magnesium ion is selected from the group consisting of magnesium chloride, magnesium sulfate, magnesium acetate, and mixtures thereof. In other embodiments, the antiscalant aqueous solution comprises about 1 ppm to about 1000 ppm of the water soluble source of magnesium ion. In other embodiments, the antiscalant aqueous solution comprises about 50 ppm to about 150 ppm of the water soluble source of magnesium ion.

In some embodiments, the food processing equipment is selected from the group consisting of an evaporator, equipment used in an ultra high temperature pasteurization process, and equipment used in a high temperature short time pasteurization process. In other embodiments, the liquid food source is selected from the group consisting of milk, whey, whey permeate, juice, calcium fortified beverages, sugar, corn wet-milling steeping liquour, and mixtures thereof. In other embodiments, the liquid food source is a fuel ethanol process stream selected from the group consisting of corn, sugar, and mixtures thereof. In still yet other embodiments, the juice is a juice subjected to an evaporation process. In yet another embodiment, the juice is selected from the group consisting of tomato juice, and carrot juice.

In some embodiments, the magnesium ion is a food grade version. In other embodiments, the scale is selected from the group consisting of a calcium salt, a mixed calcium/magnesium salt wherein the calcium is the major component, and mixtures thereof. In still yet other embodiments, the calcium salt is selected from the group consisting of calcium phosphate, calcium oxalate, calcium silicate and mixtures thereof.

In some aspects, the present invention provides a method for removing scale on industrial food processing equipment used to process a liquid food source. The method comprises applying an antiscalant aqueous solution comprising a water soluble source of magnesium ion and at least one of an acidic detergent and an alkaline detergent, to the equipment, wherein the aqueous solution is applied as a clean in place process, such that the scale on the equipment is substantially removed.

In some embodiments, the antiscalant solution comprises about 1 ppm to about 1000 ppm of the water soluble source of magnesium ion. In some embodiments, the water soluble source of magnesium ion is selected from the group consisting of magnesium chloride, magnesium sulfate, and mixtures thereof.

In other embodiments, the antiscalant aqueous solution comprises about 0.25 wt % to about 10 wt % of the acidic detergent. In some embodiments, the acidic detergent comprises at least one of phosphoric acid, nitric acid, sulfuric acid, lactic acid, acetic acid, hydroxyacetic acid, glutamic acid, glutaric acid, and citric acid.

In still yet other embodiments, the antiscalant aqueous solution comprises about 0.5 wt % to about 3 wt % of an alkaline detergent. In some embodiments, the alkaline detergent comprises at least one of sodium hydroxide, potassium hydroxide, lithium hydroxide, triethanol amine, diethanol amine, monoethanol amine, sodium metasilicate, potassium metasilicate, sodium orthosilicate, potassium orthosilicate and combinations thereof.

These and other embodiments will be apparent to these of skill in the art and others in view of the following detailed description. It should be understood, however, that this summary and the detailed description illustrate only some examples, and are not intended to be limiting to the invention as claimed.

DETAILED DESCRIPTION

Figure 1:
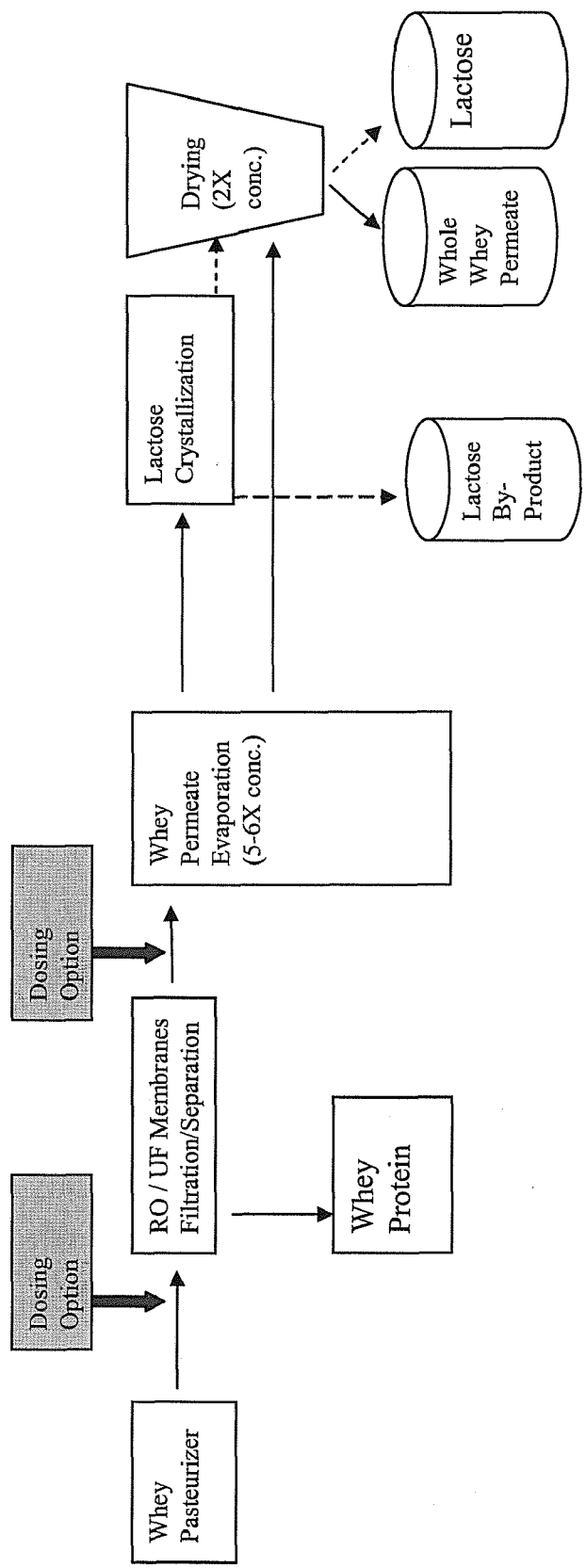
FIG. 1 is a schematic of an exemplary method for processing whey illustrating the multiple dosing points available using the methods of the present invention.

In some aspects, the present invention relates to a method for preventing scale formation on industrial equipment. The method includes preventing the precipitation of and/or increasing the solubility of calcium salts during a high temperature liquid food processing operation by applying an antiscalant aqueous solution comprising a water soluble source of magnesium ions to the industrial equipment. The addition of an effective amount of an antiscalant solution to a liquid food processing stream aids in the prevention of scale, e.g., insoluble calcium salt formation. The antiscalant can be applied to the processing equipment in a variety of ways, including, but not limited to by direct injection into the liquid food source being processed, and/or by direct injection into the equipment processing lines.

In other aspects, the present invention relates to the removal of already developed scale, e.g., insoluble calcium salts, from industrial equipment by applying an aqueous antiscalant solution comprising a water soluble source of magnesium ions to the industrial equipment, for example, as part of a clean in place cleaning regimen. The antiscalant solution may be introduced by direct injection in the food processing lines.

By reducing or preventing the amount of scale formation, the flow rate of the liquid food processing stream can be increased, increasing the run-time of the equipment and the overall efficiency of the process.

So that the invention may be more readily understood certain terms are first defined.

As used herein, "weight percent," "wt-%," "percent by weight," "% by weight," and variations thereof refer to the concentration of a substance as the weight of that substance divided by the total weight of the composition and multiplied by 100. It is understood that, as used here, "percent," "%," and the like are intended to be synonymous with "weight percent," "wt-%," etc.

As used herein, the term "about" refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about," the claims include equivalents to the quantities.

It should be noted that, as used in this specification and the appended claims, the singular forms "a," "an," and, and "the" include plural referents unless the content clearly dictates otherwise. Thus, for example, reference to a composition containing "a compound" includes having two or more compounds. It should also be noted that the term "or" is generally employed in its sense including "and/or" unless the content clearly dictates otherwise.

The term "water-soluble" as used herein refers to a compound that can be dissolved in water at a concentration of more than 1 wt %.

The term "water-insoluble" as used herein refers to a compound that can be dissolved in water only to a concentration of less than 0.1 wt %.

As used herein, the terms "slightly soluble" or "slightly water soluble" refer to a compound that can be dissolved in water only to a concentration of 0.1 to 1.0 wt %.

As used herein, the term "liquid food processing" refers to any process used to formulate, e.g., concentrate and/or evaporate, substantially liquid food product streams, where it is desirable to reduce or prevent the formation of scale, e.g. insoluble calcium salts. Liquid food products that can be processed using the methods of the present invention include, but are not limited to, milk, whey, whey permeate, fruit and vegetable juices, calcium fortified beverages, sugar, corn wet-milling steeping liquor, and fuel ethanol process streams from corn, sugar, or other biomass conversions. Exemplary processes involved in formulating these liquid food products include, but are not limited to, evaporation, filtration (e.g., reverse osmosis (RO) membranes and ultrafiltration (UF) membranes), and pasteurization (e.g., via high temperature short time (HTST) pasteurization processes, and ultra high temperature (UHT) pasteurization processes). The methods of the present invention are particularly beneficial in the high temperatures stages of the food processing operation.

The methods of the present invention can be used generally in any application where scale, e.g., insoluble calcium salts, needs to be removed or in any application where the prevention of scale formation is beneficial. The system to which the antiscalant is added may contain metal ions, such as ions of calcium, barium, magnesium, aluminum, strontium, iron, etc. and anions such as bicarbonate, carbonate, oxalate, sulfate, phosphate, silicate, etc. The methods of the present invention are especially effective at preventing or removing scale comprising calcium salts, e.g., calcium phosphate, calcium oxalate, calcium carbonate, or calcium silicate, or a calcium/magnesium salt wherein calcium is the major component. The scale which is intended to be prevented or removed by the present invention may be formed by any combination of the above-noted ions. For example, the scale may involve a combination of calcium carbonate and calcium oxalate.

Exemplary industries in which the methods of the present invention can be applied include, but are not limited to: the food and beverage industry, e.g., the dairy, cheese, sugar, and brewery industries; oil processing industry; industrial agriculture and ethanol processing; and the pharmaceutical manufacturing industry.

In some aspects, the methods of the present invention apply to equipment, e.g., industrial equipment, generally cleaned using clean-in-place (i.e., CIP) cleaning procedures. Examples of such equipment include evaporators, heat exchangers (including tube-in-tube exchangers, direct steam injection, and plate-in-frame exchangers), heating coils (including steam, flame or heat transfer fluid heated) re-crystallizers, pan crystallizers, spray dryers, drum dryers, membranes and tanks. In some embodiments, the equipment treated does not include spray dryers.

Conventional CIP processing is generally well-known. The process includes applying a dilute solution (typically about 0.5-3%) onto the surface to be cleaned. The solution flows across the surface (3 to 6 feet/second), slowly removing the soil. Either new solution is re-applied to the surface, or the same solution is recirculated and re-applied to the surface.

A typical CIP process to remove a soil (including organic, inorganic or a mixture of the two components) includes at least three steps: an alkaline solution wash, an acid solution wash, and then a fresh water rinse. The alkaline solution softens the soils and removes the organic alkaline soluble soils. The subsequent acid solution removes mineral soils left behind by the alkaline cleaning step. The strength of the alkaline and acid solutions and the duration of the cleaning steps are typically dependent on the durability of the soil. The water rinse removes any residual solution and soils, and cleans the surface prior to the equipment being returned on-line.

Antiscalant Aqueous Solutions

In some aspects, the present invention relates to methods for reducing and/or preventing scale formation on industrial equipment comprising applying an antiscalant aqueous solution to the equipment. In some embodiments, the aqueous antiscalant solution comprises a water soluble source of magnesium ions. Suitable water soluble magnesium ion sources include, but are not limited to, magnesium perborate, magnesium percarbonate, magnesium acetate, magnesium acetate tetrahydrate, magnesium acetylsalicylate, magnesium di-aluminate, magnesium benzoate, magnesium benzoate trihydrate, magnesium bromate, magnesium bromide hexahydrate, magnesium chloride, magnesium chloride hexahydrate, magnesium citrate, magnesium citrate pentahydrate, magnesium diphosphate, magnesium hydrogen phosphate, magnesium iodate, magnesium iodate tetrahydrate, magnesium iodide, magnesium iodide octahydrate, magnesium lactate, magnesium lactate trihydrate, magnesium molybdate, magnesium nitrate, magnesium nitrate hexahydrate, magnesium nitride, magnesium nitrite, magnesium peroxoborate, magnesium phosphate, magnesium phosphinate, magnesium salicylate, magnesium salicylate tetrahydrate, magnesium sulfate, magnesium sulfate heptahydrate, magnesium sulfite hexahydrate, magnesium tartrate pentahydrate, magnesium thiosulfate, magnesium thiosulfate hexahydrate, magnesium sulfite, and magnesium tartrate. In some embodiments, the magnesium ion source is selected from the group consisting of magnesium chloride, magnesium sulfate, magnesium acetate, and combinations and mixtures thereof.

The magnesium ion source is typically provided in solution. In some embodiments, the water soluble magnesium ion source is formulated on site. That is, in some embodiments, the water soluble magnesium ion source can be made at the point of use. For example, a solution of magnesium hydroxide can be combined on site with a solution of sulfuric acid. The resulting solution of magnesium sulfate can then be used as part of an antiscalant aqueous solution according to the methods of the present invention to prevent or remove scale formation. In other embodiments, the magnesium ion source is preformed, e.g., an antiscalant aqueous solution comprising the water soluble magnesium ion source, e.g., magnesium sulfate, is provided for on site use.

In some aspects, the present invention provides methods for removing and/or preventing scale formation on industrial food processing equipment used to process a liquid food source. The method comprises applying an antiscalant aqueous solution comprising a water soluble magnesium ion source to the equipment. The antiscalant aqueous solution can be applied to the equipment in a variety of ways including, but not limited to, by direct injection into the liquid food source being processed prior to evaporation and/or by direct injection in the process lines of the equipment.

When application of the antiscalant solution occurs via direct injection into the liquid food source, the magnesium ion sources chosen should either be characterized by the United States Food and Drug Administration as direct or indirect food additives or as stable water solutions. Water soluble magnesium salts approved as generally recognized as safe (GRAS) for direct food contact include magnesium chloride, magnesium carbonate, magnesium sulfate, and magnesium phosphate.

In some embodiments, the antiscalant aqueous solution comprises about 1 ppm to about 1000 ppm of a water soluble source of magnesium ion. In some embodiments, the antiscalant aqueous solution comprises about 25 ppm to about 400 ppm of the water soluble magnesium ion source. In some embodiments, the antiscalant aqueous solution comprises about 50 ppm to about 150 ppm of the water soluble magnesium ion source. In still yet other embodiments, the scale preventing aqueous solution comprises about 100 ppm of the water soluble magnesium ion source. It is to be understood that all values and ranges between these values and ranges are encompassed by the methods of the present invention.

The antiscalant aqueous solutions of the present invention can be used under various pH conditions. For example, the antiscalants of the present invention can be used at a pH from about 2 to 14, more preferably about 3 to 14, and most preferably about 4 to 14. The aqueous antiscalants of the present invention can also be used under acidic conditions against some forms of scale, such as oxalate scales. For oxalate scaling, the liquid food processing stream to which the antiscalant is added often has a pH less than about 8, such as about 2 to 8, even more usually about 3 to 8. For example, the pH of a liquid food stream being processed can be about 2 to about 12, about 2 to about 7, or about 2.5 to about 5. Thus, the pH of the antiscalant solution will be, for example, about 2 to about 12, about 2 to about 7, or about 2.5 to about 5.

For carbonate scaling, the liquid food processing stream to which the antiscalant is added has a basic pH. In some embodiments, the pH is at least about 9, with ranges of between about 9 to about 14, about 10 to about 13, and about 10.2 to about 12. Thus, the pH of the antiscalant aqueous solution will be, e.g., about 9 to about 14, about 10 to about 13, and about 10.2 to about 12.

In some embodiments, when used to remove scale that has already formed on industrial food processing equipment, the antiscalant aqueous composition can be incorporated with an acid detergent. Exemplary acidic detergents for use with the methods of the present invention include, but are not limited to, phosphoric acid, nitric acid, sulfuric acid, lactic acid, acetic acid, hydroxyacetic acid, glutamic acid, glutaric acid, citric acid, and mixtures thereof.

In some embodiments, when formulated with an acidic detergent, the antiscalant aqueous solution comprises about 0.25 wt % to about 10 wt % of an acidic detergent. In some embodiments, the antiscalant aqueous solution comprises about 2 to about 5 wt % of an acidic detergent. In still yet other embodiments, the antiscalant aqueous solution comprises about 0.5 to about 1.5 wt % of an acidic detergent. It is to be understood that all values and ranges between these values and ranges are encompassed by the present invention.

In other embodiments, when used to remove scale that has already formed on industrial food processing equipment, the antiscalant aqueous composition can be incorporated with an alkaline detergent. In some embodiments, the antiscalant aqueous solution can be applied as a separate additive to a conventional alkaline CIP solution that is formulated on site. In other embodiments, the antiscalant aqueous solution can be incorporated into a conventional alkaline CIP solution previously formulated. Exemplary alkaline detergents suitable for use with the methods of the present invention include, but are not limited to, sodium hydroxide, potassium hydroxide, lithium hydroxide, triethanol amine, diethanol amine, monoethanol amine, sodium metasilicate, potassium metasilicate, sodium orthosilicate, potassium orthosilicate, and combinations thereof.

In some embodiments, when formulated with an alkaline detergent, the antiscalant aqueous solution comprises about 0.25 wt % to about 10 wt % of an alkaline detergent. In some embodiments, the antiscalant aqueous solution comprises about 2 to about 5 wt % of an alkaline detergent. In still yet other embodiments, the antiscalant aqueous solution comprises about 0.5 to about 1.5 wt % of an alkaline detergent. It is to be understood that all values and ranges between these values and ranges are encompassed by the present invention.

In some embodiments, an effective amount of antiscalant aqueous solution is applied to industrial food processing equipment such that the scale on the equipment is substantially removed. In some embodiments, at least about 10% of scale deposition is removed from the equipment. In other embodiments, at least about 25% of scale deposition is removed. In still yet other embodiments, at least about 50% of scale deposition is removed. In some embodiments, about 90% of scale deposition is removed.

In some embodiments, an effective amount of antiscalant aqueous solution is applied to industrial food processing equipment such that formation of scale on the equipment is substantially prevented. In some embodiments, at least about 10% of scale deposition is prevented. In other embodiments, at least about 25% of scale deposition is prevented. In still yet other embodiments, at least about 50% of scale deposition is prevented. In some embodiments, about 90% of scale deposition is prevented.

Additional Functional Ingredients

In some embodiments, the antiscalant aqueous solution further comprises additional functional ingredients. The term "functional ingredients" or "functional additives" refers to an active compound or material that affords desirable properties to the antiscalant aqueous solution. Examples of functional materials suitable for use with the present invention include, but are not limited to, chelating/sequestering agent, alkalinity source, penetrants/surfactants, cleaning agent, softening agent, buffer, anti-corrosion agent, bleach activators secondary hardening agent or solubility modifier, detergent filler, defoamer, anti-redeposition agent, antimicrobials, rinse aid compositions, a threshold agent or system, aesthetic enhancing agent (i.e., dye, perfume), lubricant compositions, additional bleaching agents, functional salts, hardening agents, solubility modifiers, enzymes, other such additives or functional ingredients, and the like, and mixtures thereof.

Functional materials added to a composition will vary according to the type of composition being manufactured, and the intended end use of the composition. For example, if the antiscalant aqueous solution is added directly to the food stream being processed, the additional functional ingredient will be one that is generally recognized as safe for food additives. If the antiscalant aqueous solution is used to remove already formed scale, then additional functional ingredients can include, for example, organic surfactants or cleaning agents.

In some embodiments, the antiscalant aqueous solutions of the present invention can be used with other known antiscalants, for example, phosphates, acrylates, aminocarboxylates, hydroxycarboxylates, phosphonates, sulfonates, and maleates. The amount of other antiscalant to be combined with the antiscalant aqueous solution of the present invention depends upon the conditions of the equipment to be treated as well as the types of antiscalants. The weight ratio of the known antiscalant to the antiscalant of the present invention is preferably from about 1:100 to 100:1, more preferably about 1:30 to 30:1, and most preferably about 1:10 to 10:1.

In some embodiments, an additional known antiscalant is added to the equipment at the same time as the antiscalant aqueous solution of the present invention. In other embodiments, an additional known antiscalant is added to the equipment before the antiscalant aqueous solution of the present invention. In still yet other embodiments, an additional known antiscalant, and the antiscalant aqueous solution of the present invention are added to the equipment substantially simultaneously.

Organic Surfactants or Cleaning Agents

In some embodiments, the antiscalant aqueous solution can further comprise at least one cleaning agent which can be a surfactant or surfactant system. A variety of surfactants can be used in a cleaning composition, including anionic, nonionic, cationic, and zwitterionic surfactants, which are commercially available from a number of sources. Suitable surfactants include nonionic surfactants. Suitable nonionic surfactants include low foaming non-ionic surfactants. For a discussion of surfactants, see Kirk-Othmer, *Encyclopedia of Chemical Technology*, Third Edition, volume 8, pages 900-912.

Nonionic surfactants useful in the antiscalant aqueous solutions of the present invention include those having a polyalkylene oxide polymer as a portion of the surfactant molecule. Such nonionic surfactants include, for example, chlorine-, benzyl-, methyl-, ethyl-, propyl-, butyl- and other like alkyl-capped polyethylene and/or polypropylene glycol ethers of fatty alcohols; polyalkylene oxide free nonionics such as alkyl polyglycosides; sorbitan and sucrose esters and their ethoxylates; alkoxylated ethylene diamine; carboxylic acid esters such as glycerol esters, polyoxyethylene esters, ethoxylated and glycol esters of fatty acids, and the like; carboxylic amides such as diethanolamine condensates, monoalkanolamine condensates, polyoxyethylene fatty acid amides, and the like; and ethoxylated amines and ether amines commercially available from Tomah Corporation and other like nonionic compounds. Silicone surfactants such as the ABIL B8852 (Goldschmidt) can also be used.

Additional suitable nonionic surfactants having a polyalkylene oxide polymer portion include nonionic surfactants of C6-C24 alcohol ethoxylates (e.g., C6-C14 alcohol ethoxylates) having 1 to about 20 ethylene oxide groups (e.g., about 9 to about 20 ethylene oxide groups); C6-C24 alkylphenol ethoxylates (e.g., C8-C10 alkylphenol ethoxylates) having 1 to about 100 ethylene oxide groups (e.g., about 12 to about 20 ethylene oxide groups); C6-C24 alkylpolyglycosides (e.g., C6-C20 alkylpolyglycosides) having 1 to about 20 glycoside groups (e.g., about 9 to about 20 glycoside groups); C6-C24 fatty acid ester ethoxylates, propoxylates or glycerides; and C4-C24 mono or dialkanolamides.

Specific alcohol alkoxylates include alcohol ethoxylate propoxylates, alcohol propoxylates, alcohol propoxylate ethoxylate propoxylates, alcohol ethoxylate butoxylates, and the like; nonylphenol ethoxylate, polyoxyethylene glycol ethers and the like; and polyalkylene oxide block copolymers including an ethylene oxide/propylene oxide block copolymer such as those commercially available under the trademark PLURONIC (BASF-Wyandotte), and the like.

Suitable nonionic surfactants include low foaming nonionic surfactants. Examples of suitable low foaming nonionic surfactants include secondary ethoxylates, such as those sold under the trade name TERGITOL™, such as TERGITOL™ 15-S-7 (Union Carbide), Tergitol 15-S-3, Tergitol 15-S-9 and the like. Other suitable classes of low foaming nonionic surfactant include alkyl or benzyl-capped polyoxyalkylene derivatives and polyoxyethylene/polyoxypropylene copolymers.

A useful nonionic surfactant for use as a defoamer is nonylphenol having an average of 12 moles of ethylene oxide condensed thereon, it being end capped with a hydrophobic portion comprising an average of 30 moles of propylene oxide. Silicon-containing defoamers are also well-known and can be employed in the compositions and methods of the present invention.

Suitable amphoteric surfactants include amine oxide compounds having the formula:

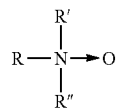

where R, R', R", and R'" are each a C1-C24 alkyl, aryl or aralkyl group that can optionally contain one or more P, O, S or N heteroatoms.

Another class of suitable amphoteric surfactants includes betaine compounds having the formula:

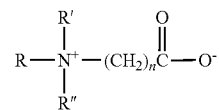

where R, R', R" and R'" are each a C1-C24 alkyl, aryl or aralkyl group that can optionally contain one or more P, O, S or N heteroatoms, and n is about 1 to about 10.

Suitable surfactants include food grade surfactants, linear alkylbenzene sulfonic acids and their salts, and ethylene oxide/propylene oxide derivatives sold under the Pluronic™ trade name. Suitable surfactants include those that are compatible as an indirect or direct food additive or substance; especially those described in the Code of Federal Regulations (CFR), Title 21-Food and Drugs, parts 170 to 186 (which is incorporated herein by reference).

Anionic surfactants suitable for the present cleaning compositions, include, for example, carboxylates such as alkylcarboxylates (carboxylic acid salts) and polyalkoxycarboxylates, alcohol ethoxylate carboxylates, nonylphenol ethoxylate carboxylates, and the like; sulfonates such as alkylsulfonates, alkylbenzenesulfonates, alkylarylsulfonates, sulfonated fatty acid esters, and the like; sulfates such as sulfated alcohols, sulfated alcohol ethoxylates, sulfated alkylphenols, alkylsulfates, sulfosuccinates, alkylether sulfates, and the like; and phosphate esters such as alkylphosphate esters, and the like. Suitable anionics include sodium alkylarylsulfonate, alpha-olefin sulfonate, and fatty alcohol sulfates. Examples of suitable anionic surfactants include sodium dodecylbenzene sulfonic acid, potassium laureth-7 sulfate, and sodium tetradecenyl sulfonate.

The surfactant can be present at amounts of about 0.01 to about 20 wt-%, about 0.1 to about 10 wt-%, or about 0.2 to about 5 wt-%. It is to be understood that all ranges and values within these ranges and values are to be encompassed by the present invention.

Oxidizing Agent

The antiscalant aqueous solutions can further comprise an oxidizing agent or an oxidizer, such as a peroxide or peroxyacid. Suitable ingredients are oxidants such as chlorites, bromine, bromates, bromine monochloride, iodine, iodine monochloride, iodates, permanganates, nitrates, nitric acid, borates, perborates, and gaseous oxidants such as ozone, oxygen, chlorine dioxide, chlorine, sulfur dioxide and derivatives thereof. Peroxygen compounds, which include peroxides and various percarboxylic acids, including percarbonates, are suitable.

Peroxycarboxylic (or percarboxylic) acids generally have the formula $R(CO_3H)_n$, where, for example, R is an alkyl, arylalkyl, cycloalkyl, aromatic, or heterocyclic group, and n is one, two, or three, and named by prefixing the parent acid with peroxy. The R group can be saturated or unsaturated as well as substituted or unsubstituted. Medium chain peroxycarboxylic (or percarboxylic) acids can have the formula $R(CO_3H)_n$, where R is a $C_5$-$C_{11}$ alkyl group, a $C_5$-$C_{11}$ cycloalkyl, a $C_5$-$C_{11}$ arylalkyl group, $C_5$-$C_{11}$ aryl group, or a $C_5$-$C_{11}$ heterocyclic group; and n is one, two, or three. Short chain fatty acids can have the formula $R(CO_3H)_n$ where R is $C_1$-$C_4$ and n is one, two, or three.

Some peroxycarboxylic acids include peroxypentanoic, peroxyhexanoic, peroxyheptanoic, peroxyoctanoic, peroxynonanoic, peroxyisononanoic, peroxydecanoic, peroxyundecanoic, peroxydodecanoic, peroxyascorbic, peroxyadipic, peroxycitric, peroxypimelic, or peroxysuberic acid, mixtures thereof, or the like.

Branched chain peroxycarboxylic acid include peroxyisopentanoic, peroxyisononanoic, peroxyisohexanoic, peroxyisoheptanoic, peroxyisooctanoic, peroxyisonananoic, peroxyisodecanoic, peroxyisoundecanoic, peroxyisododecanoic, peroxyneopentanoic, peroxyneohexanoic, peroxyneoheptanoic, peroxyneooctanoic, peroxyneononanoic, peroxyneodecanoic, peroxyneoundecanoic, peroxyneododecanoic, mixtures thereof, or the like.

Typical peroxygen compounds include hydrogen peroxide ($H_2O_2$), peracetic acid, peroctanoic acid, a persulphate, a perborate, or a percarbonate.

The amount of oxidant in the antiscalant solution, if present, is at least 0.01 wt-% and no greater than 1 wt-%. Acceptable levels of oxidant are 0.01 to 0.50 wt-%; 0.3 wt-% is a particularly suitable level.

Builders

The antiscalant aqueous solution may further comprise a builder. Builders include chelating agents (chelators), sequestering agents (sequestrants), detergent builders, and the like. The builder often stabilizes the composition or solution. Examples of builders include phosphonates, phosphates, aminocarboxylates and their derivatives, pyrophosphates, polyphosphates, ethylenediamene and ethylenetriamene derivatives, hydroxyacids, and mono-, di-, and tri-carboxylates and their corresponding acids. Other builders include aluminosilicates, nitroloacetates and their derivatives, and mixtures thereof. Still other builders include aminocarboxylates, including salts of ethylenediaminetetraacetic acid (EDTA), hydroxyethylenediaminetetraacetic acid (HEDTA), and diethylenetriaminepentaacetic acid. Preferred builders are water soluble.

Particularly preferred builders include EDTA (including tetra sodium EDTA), TKPP (tetrapotassium pyrophosphate), PAA (polyacrylic acid) and its salts, phosphonobutane carboxylic acid, and sodium gluconate.

The amount of builder in the antiscalant solution, if present, is typically at least 0.25 wt-% and no greater than 5 wt-%. Acceptable levels of builder include 0.5 to 1.0 wt-% and 1 wt-% to 2.5 wt-%.

Methods of Use

In some aspects, the methods of the present invention are used to remove scale, e.g., calcium salt scale, or prevent scale formation on equipment used to process liquid food products. Exemplary liquid food products that can be treated using the methods of the present invention, include but are not limited to milk, whey, whey permeate, juice, calcium fortified beverages, sugar, corn wetmilling steeping liquor, and mixtures thereof. In some embodiments, the methods of the present invention are used to remove scale or prevent scale formation on or in equipment used to process a liquid food source that is a fuel ethanol process stream selected from the group consisting of corn, sugar, and mixtures thereof. In other embodiments, the methods of the present invention remove or prevent scale formation on equipment used to evaporate or concentrate juice, e.g., tomato, carrot and sugar juice.

The antiscalant aqueous solution of the present invention can be applied to the equipment in a variety of ways. For example, when used to prevent scale formation, the antiscalant can be applied to the equipment by direct injection into the liquid food stream being processed, by application onto and/or into the equipment process lines, or process water, before or after a food stream has been processed, and/or by supplying the antiscalant solution to the balance tank. When used to remove scale already formed on equipment the antiscalant aqueous solution can be applied to the surface of the equipment by a variety of methods. For example, the antiscalant solution can be applied by direct injection onto and/or into the process lines of the equipment.

The application of the aqueous antiscalant can comprise any form of application suitable for applying the antiscalant aqueous solution to the surface of the equipment to be treated. For example, the antiscalant aqueous solution can be poured, sprayed, or injected onto or into the equipment to be treated. The application of the antiscalant solution can be followed by a rinse, e.g., a water rinse, by a conventional cleaning process, e.g., a conventional clean in place process, or by the introduction of a liquid food stream to be processed by the equipment.

Unlike certain conventional liquid food processing additives, e.g., WPA 1000, which can only be added to the food stream or process lines after the food product has been filtered, the antiscalant compositions of the present invention can be applied to the liquid food source or the process lines at multiple stages in the process. FIG. 1 is a flow chart depicting the multiple dosing points available when using the methods of the present invention in, for example, a whey processing system. As can be seen from this figure, an antiscalant aqueous solution of the present invention can be added either before or after the filtration step. Further, the antiscalant aqueous solutions of the present invention can be added both before and after the filtration step. That is, the antiscalant aqueous solutions of the present invention can be added to the food processing system at multiple entry points, and at multiple times.

In some aspects, the present invention provides methods for removing scale already formed on industrial food processing equipment used to process a liquid food source. The method comprises applying an antiscalant aqueous solution comprising a soluble magnesium ion and at least one of an acidic detergent and an alkaline detergent, to the equipment. The amount of soluble magnesium ion applied to the equipment is dependent upon a variety of factors, including, but not limited to, temperature, the pH, and the equipment being treated. For example, higher temperatures may require higher amounts of the soluble magnesium ion source.

In some embodiments, the equipment to which the antiscalant aqueous solution is added may be at an elevated temperature. For instance, the temperature of the equipment may be about 25° C. to about 95° C. In some embodiments, the temperature of the equipment may be about 70° C. to about 95° C. In other embodiments, the temperature of the equipment may be about 80° C. to about 95° C. When the antiscalant solution is added to equipment used in a pasteurization process, the temperature of the equipment is usually about 20° C. to about 120° C. When the antiscalant is added equipment used to process whey or whey permeate, the temperature of the equipment is usually about 50° C. to about 85° C.

EXAMPLES

The present invention is more particularly described in the following examples that are intended as illustrations only, since numerous modifications and variations within the scope of the present invention will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques.

In particular, the experiments of Examples 1, 2, 3, 4, and 5 were directed toward determining the effect of magnesium ions on preventing the precipitation of calcium salts and the experiment of Example 6 was directed towards determining the effect of magnesium ions increasing the solubility of calcium salts.

Examples 1 and 2

Calcium Phosphate Inhibition Test

Example 1 was a "cook-down" experiment designed to represent the concentrate of whey in an evaporator. Whey permeate samples from a cheese plant were collected and tested for calcium and phosphate content. Each of the whey permeate samples were placed in a separate beaker and placed in a hot water bath having a temperature of between about 190° F. and about 200° F. for several hours to evaporate most of the water from the samples. The remaining whey permeate concentrate was rinsed out of the beaker.

A plurality of antiscalant aqueous solutions were prepared that included a calcium salt inhibitor. Compositions 1, 2, 3, 4, 5, 6, 7, and 8 included a water soluble source of magnesium ions, i.e., $MgCl_2 \cdot 6H_2O$, as the calcium salt inhibitor. Comparative Compositions A, B, C, D, E, F, G, and H included WPA, a known calcium salt inhibitor. Composition 1 and Comparative Composition A included about 100 ppm of calcium salt inhibitor, Composition 2 and Comparative Composition B included about 200 ppm of calcium salt inhibitor, Composition 3 and Comparative Composition C included about 300 ppm of calcium salt inhibitor, Composition 4 and Comparative Composition D included about 400 ppm of calcium salt inhibitor, Composition 5 and Comparative Composition E included about 600 ppm of calcium salt inhibitor, Composition 6 and Comparative Composition F included about 800 ppm of calcium salt inhibitor, Composition 7 and Comparative Composition G included about 1000 ppm of calcium salt inhibitor, and Composition 8 and Comparative Composition H included about 1200 ppm of calcium salt inhibitor.

The beakers were rinsed with each of the above compositions to remove any residual film. The compositions were then submitted for analysis by an analytical tool, Inductively Coupled Plasma (ICP), to measure the concentration of metal salts in solution for calcium. The concentrations of calcium salt inhibitor compositions and the resulting concentrations of calcium ions are shown in Table 1. These results are also graphically depicted in FIG. 2.

Figure 2:
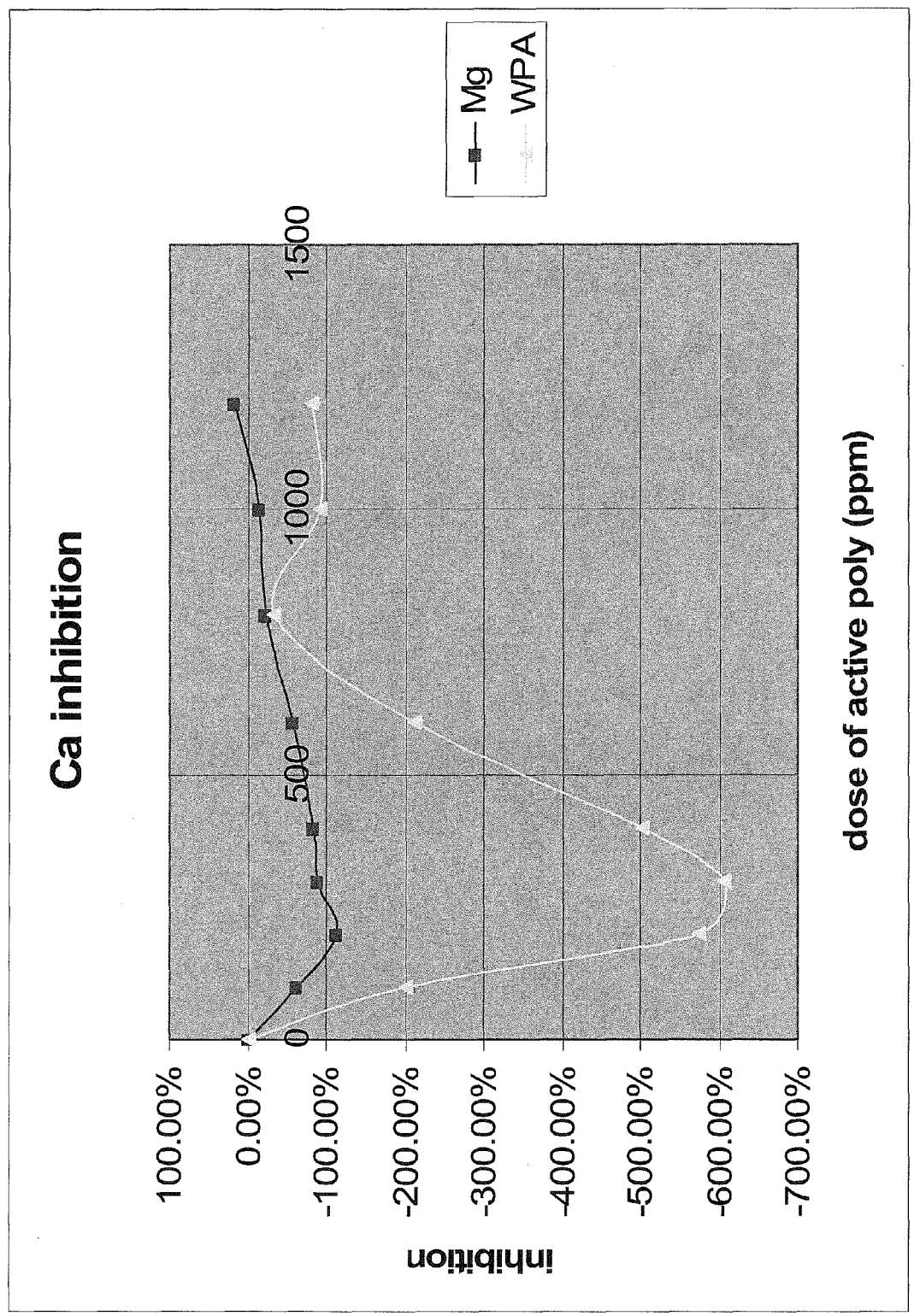
FIG. 2 is a graphical depiction of the amount of inhibition of calcium salt precipitation using an antiscalant aqueous composition of the present invention compared to a known antiscalant composition.

As can be seen from the data in Table 1, and FIG. 2, the compositions (Compositions 1-8) which contained magnesium ions resulted in less calcium than the compositions (Comparative Compositions A-H) which contained a known calcium salt inhibitor. Generally, as the level of magnesium ions in the compositions increased, less calcium precipitated out of solution. This indicates that less calcium phosphate deposited onto the walls of the beakers because it is assumed that the less calcium ions in the extraction solution, the less calcium phosphate in solution.

Example 2 was designed to determine whether the magnesium ions were simply replacing the calcium ions and to form magnesium phosphate or whether there was actual inhibition of salt formation.

Antiscalant aqueous compositions 9, 10, 11, and 12 included a water soluble source of magnesium ions as the calcium salt inhibitor. To prepare a composition having about 250 ppm of magnesium ions, about 0.1673 grams of $MgCl_2 \cdot 6H_2O$ was added to about 80 ml of deionized water; to prepare a composition having about 500 ppm of magnesium ions, about 0.3346 grams of $MgCl_2 \cdot 6H_2O$ was added to about 80 ml of deionized water; to prepare a composition having about 600 ppm of magnesium ions, about 0.5019 grams of $MgCl_2 \cdot 6H_2O$ was added to about 80 ml of deionized water; and to prepare a composition having about 800 ppm of magnesium ions, about 0.6692 grams of $MgCl_2 \cdot 6H_2O$ was added to about 80 ml of deionized water.

Comparative Compositions I, J, K, and L included WPA, a known calcium salt inhibitor. To prepare a composition having about 100 ppm of magnesium ions, about 0.25 grams of a 10% solution of 40% WPA was added to about 80 ml of deionized water; to prepare a composition having about 200 ppm of magnesium ions, about 0.5 grams of a 10% solution of 40% WPA was added to about 80 ml of deionized water; to prepare a composition having about 300 ppm of magnesium ions, about 0.75 grams of a 10% solution of 40% WPA was added to about 80 ml of deionized water; and to prepare a composition having about 400 ppm of magnesium ions, about 1 gram of a 10% solution of 40% WPA was added to about 80 ml of deionized water.

The same procedure was followed as in Example 1, except that the level of magnesium ions in the final compositions was also analyzed and recorded. Table 2 shows the concentrations of the calcium salt inhibitor in the compositions and the resulting concentrations of calcium ions and magnesium ions.

TABLE 1

| Calcium Salt Inhibitor (ppm) | Composition | $Ca^{++}$ from Scale (ppm) | Composition | $Ca^{++}$ from Scale (ppm) |
|---|---|---|---|---|
| 0 | Control | 9.61 | Control | 9.61 |
| 100 | Composition 1 | 15.7 | Composition A | 29 |
| 200 | Composition 2 | 20.5 | Composition B | 64.8 |
| 300 | Composition 3 | 18.2 | Composition C | 68 |
| 400 | Composition 4 | 17.8 | Composition D | 58 |
| 600 | Composition 5 | 15.2 | Composition E | 30 |
| 800 | Composition 6 | 11.7 | Composition F | 12.8 |
| 1000 | Composition 7 | 11.1 | Composition G | 18.4 |
| 1200 | Composition 8 | 7.89 | Composition H | 17.5 |

TABLE 2

| Composition | Calcium Salt Inhibitor (ppm) | $Ca^{++}$ from Scale (ppm) | $Mg^{++}$ from scale (ppm) |
|---|---|---|---|
| Control | 0 | 21.7 | 0.912 |
| Composition 9 | 200 | 15.4 | 1.13 |
| Composition 10 | 400 | 19.7 | 2.78 |
| Composition 11 | 600 | 12 | 1.81 |
| Composition 12 | 800 | 9.06 | 1.74 |
| Composition I | 100 | 82.5 | 2.19 |

TABLE 2-continued

| Composition | Calcium Salt Inhibitor (ppm) | $Ca^{++}$ from Scale (ppm) | $Mg^{++}$ from scale (ppm) |
|---|---|---|---|
| Composition J | 200 | 69.2 | 1.87 |
| Composition K | 300 | 37.4 | 1.18 |
| Composition L | 400 | 18.1 | 1.23 |

As can be seen from Table 2, the antiscalant aqueous solutions (Compositions 9-12) which contained magnesium ions again produced substantially less calcium than the compositions (Compositions I-L) which contained a known calcium salt inhibitor. Generally, as the level of magnesium ions in solution increased, the level of calcium ions in solution also increased, indicating that less calcium phosphate deposited onto the walls of the beakers.

In addition, the presence of magnesium ions in the final composition indicates that there is not a replacement of calcium ions with magnesium ions with the phosphate, but that there is actual inhibition of calcium salt precipitation. The levels of magnesium ions also illustrate that there was less overall deposition of soil, not just deposition of magnesium phosphate instead of calcium phosphate.

Examples 3 and 4

Calcium Oxalate Inhibition Test

Stock solutions of a 0.1 molar ammonium oxalate solution and a 0.1 molar calcium chloride solution were first prepared. The ammonium oxalate solution was prepared by mixing about 14.21 grams of ammonium oxalate with deionized water to a final volume of one liter. The calcium chloride solution was prepared by mixing about 14.23 grams of calcium chloride with deionized water to a final volume of about one liter. The solutions were stirred for about 30 minutes.

The stock magnesium chloride solution was prepared by first adding about 10.456 grams of $MgCl_2.6H_2O$ to a one liter flask. Deionized water was then added such that there was a total of about 1000 grams of 1250 ppm stock magnesium solution. The 1250 ppm stock magnesium solution was stirred for about 30 minutes. Various mixtures were then prepared from the 1250 ppm magnesium ion composition. To prepare an antiscalant aqueous solution comprising 100 ppm magnesium ion (Composition 13), about 180 milliliters (ml) of deionized water was added to about 20 ml of the 1250 ppm stock magnesium solution; to prepare an antiscalant aqueous solution comprising about 200 ppm magnesium ion (Composition 14), about 160 milliliters of deionized water was added to about 40 ml of the 1250 ppm stock magnesium solution; to prepare an antiscalant aqueous solution comprising about 400 ppm magnesium ion (Composition 15), about 120 milliliters of deionized water was added to about 80 ml of the 1250 ppm stock magnesium solution; to prepare an antiscalant aqueous solution comprising about 800 ppm magnesium ion (Composition 16), about 40 milliliters of deionized water was added to about 160 ml of the 1250 ppm stock magnesium solution; and to prepare an antiscalant aqueous solution comprising about 1000 ppm magnesium ion composition (Composition 18), no deionized water was added about 200 ml of the 1250 ppm stock magnesium solution. About 80 ml of each of the above antiscalant aqueous solutions were added to 6 beakers.

About 10 ml of each of the ammonium oxalate and calcium chloride stock solutions were then pre-measured and added to each of Compositions 13-17 while simultaneously being stirred. Compositions 13-17 were stirred for about 2 minutes and allowed to sit for about 20 minutes in order to allow the precipitate to settle. A syringe was then used to pull off about 50 ml samples of each of Compositions 13-17. The samples were filtered through a 0.45 micron filter and submitted for analysis by ICP to measure the amount of calcium in solution.

Figure 3:
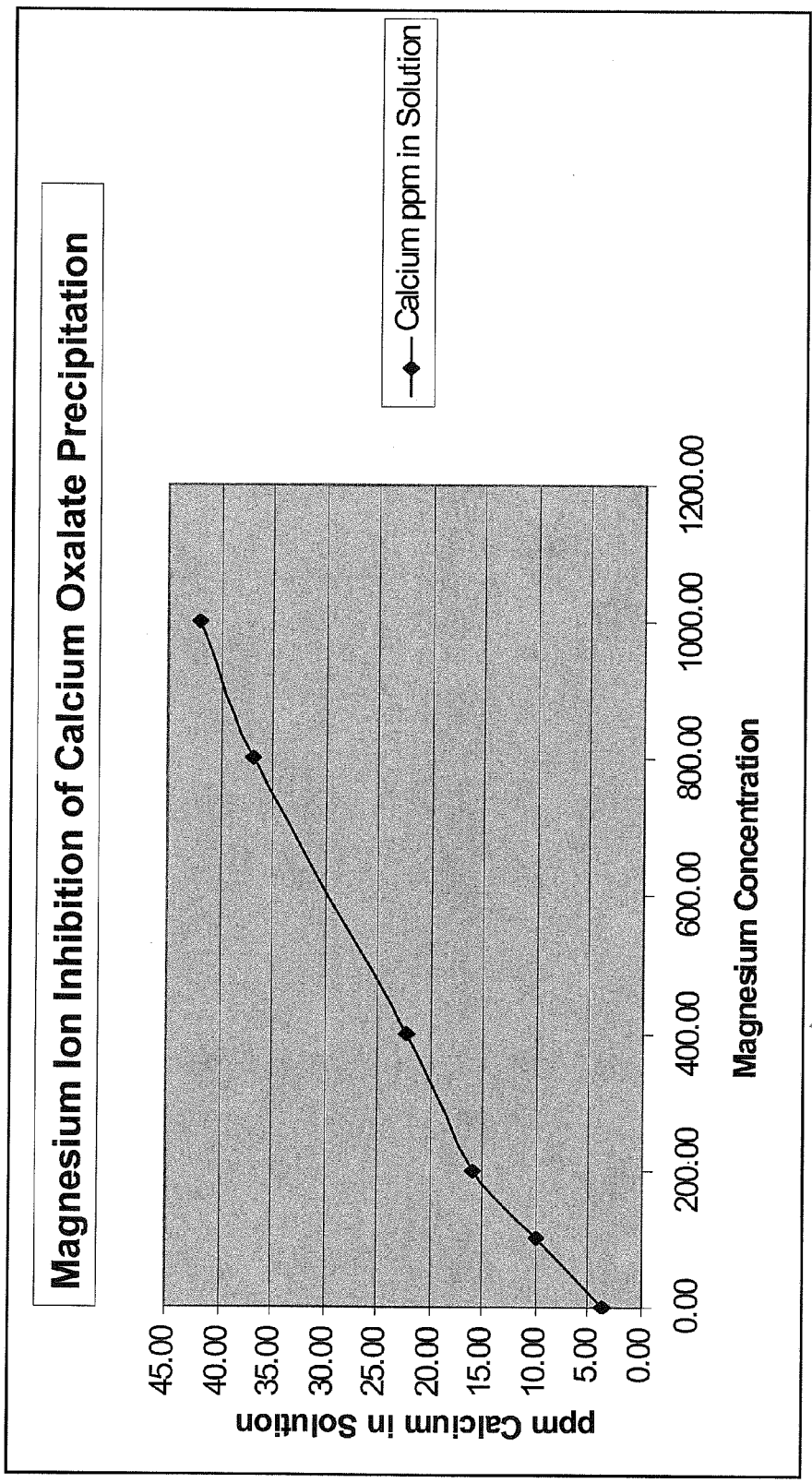
FIG. 3 is a graphical depiction of the inhibition of calcium oxalate precipitation using antiscalant aqueous compositions of the present invention comprising varying amounts of magnesium.

The concentrations of magnesium ions in the antiscalant aqueous solutions and the resulting concentrations of calcium ions are shown in Table 3. These results are also graphically depicted in FIG. 3. It was assumed that the presence of calcium ions in solution were evidence of oxalate ions in solution as well.

TABLE 3

| Composition | Magnesium Ion Concentration (ppm) | $Ca^{++}$ (ppm) |
|---|---|---|
| Control | 0 | 3.61 |
| Composition 13 | 100 | 10 |
| Composition 14 | 200 | 16.1 |
| Composition 15 | 400 | 22.3 |
| Composition 16 | 800 | 36.8 |
| Composition 17 | 1000 | 41.9 |

As can be seen from the data in Table 3, as the level of magnesium ions in solution increased, the level of calcium ions in solution also increased. The higher concentration of calcium ions in solution indicates that there was an increase in the concentration of calcium ions and oxalate ions remaining in the solution that did not precipitate into solution. The higher the level of calcium ions, the less calcium oxalate in solution. Thus, the level of calcium oxalate that precipitated into solution decreased with the addition of magnesium ions.

In Example 4, additional tests were performed to determine whether the pH of the antiscalant aqueous solutions comprising a magnesium ion source affected the ability of the magnesium ions to inhibit the formation of calcium salts. A first set of antiscalant aqueous compositions (Compositions 18-22) was prepared using deionized water such that the resulting composition had a substantially neutral pH, a second set of antiscalant aqueous compositions (Compositions 23-27) was prepared using sulfuric acid such that the resulting compositions had a pH of about 3.6, and a third set of antiscalant aqueous compositions (Compositions 28-32) was prepared using sodium hydroxide such that the resulting compositions had a pH of about 9.5.

In addition, the concentrations of magnesium ions expected to be present in the resulting compositions were also determined. The expected concentration of magnesium ions is based on the solubility constant of the composition in water. For example, at about 20° C., magnesium oxalate has a solubility of 0.138 g/100 ml with a predicted total ppm of 1380 and a predicted metal ion ppm of 261. This general concept was used to determine the predicted level of magnesium ions in solution. Table 4 illustrates the concentration of the magnesium ion in the antiscalant aqueous solutions compositions, the pHs of the compositions before addition of the solutions comprising a magnesium ion source, the resulting concentrations of calcium ions, and the actual and predicted concentrations of magnesium ions.

TABLE 4

| Composition | Initial Magnesium Ion Present (ppm) | pH | $Ca^{++}$ (ppm) | Actual $Mg^{++}$ (ppm) | Predicted $Mg^{++}$ (ppm) |
|---|---|---|---|---|---|
| Control | 0 | 8.1 | 1.6 | 0 | 0 |
| Composition 18 | 100 | 7.31 | 4.85 | 84 | 94 |

TABLE 4-continued

| Composition | Initial Magnesium Ion Present (ppm) | pH | Ca++ (ppm) | Actual Mg++ (ppm) | Predicted Mg++ (ppm) |
|---|---|---|---|---|---|
| Composition 19 | 200 | 6.95 | 8.28 | 185 | 187 |
| Composition 20 | 400 | 6.54 | 16 | 374 | 375 |
| Composition 21 | 800 | 6.19 | 25.3 | 757 | 750 |
| Composition 22 | 1000 | 5.98 | 30.6 | 940 | 937 |
| Control | 0 | 3.6 | 1.97 | 0 | 0 |
| Composition 23 | 100 | 3.6 | 6.32 | 79.8 | 94 |
| Composition 24 | 200 | 3.6 | 7.76 | 168 | 187 |
| Composition 25 | 400 | 3.6 | 14.8 | 343 | 375 |
| Composition 26 | 800 | 3.6 | 25.6 | 667 | 750 |
| Composition 27 | 1000 | 3.6 | 29.4 | 856 | 937 |
| Control | 0 | 9.5 | 1.34 | 0 | 0 |
| Composition 28 | 100 | 9.5 | 4.53 | 78.2 | 94 |
| Composition 29 | 200 | 9.5 | 6.69 | 172 | 187 |
| Composition 30 | 400 | 9.5 | 51.6 | 343 | 375 |
| Composition 31 | 800 | 9.5 | 21.8 | 681 | 750 |
| Composition 32 | 1000 | 9.5 | 26.6 | 878 | 937 |

The results in Table 4 indicate that magnesium ions are effective at controlling the precipitation of calcium salts regardless of the pH of the solution. Calcium oxalate is known to have very low solubility in water, at about 20° C., calcium oxalate has a solubility of 0.000653 g/100 ml with a predicted total ppm of 6.53 and a predicted metal ion ppm of 2.04. This general concept was used to determine the predicted level of calcium ions in solution. The controls (no magnesium ions) matched the predicted levels of calcium ions in solution based on the solubility constant. Regardless of the pH, as the level of magnesium ions increased, more calcium ions were measured in the solutions. This indicates the calcium salt precipitation inhibition properties and/or increased solubility properties of magnesium ions.

Figure 4:
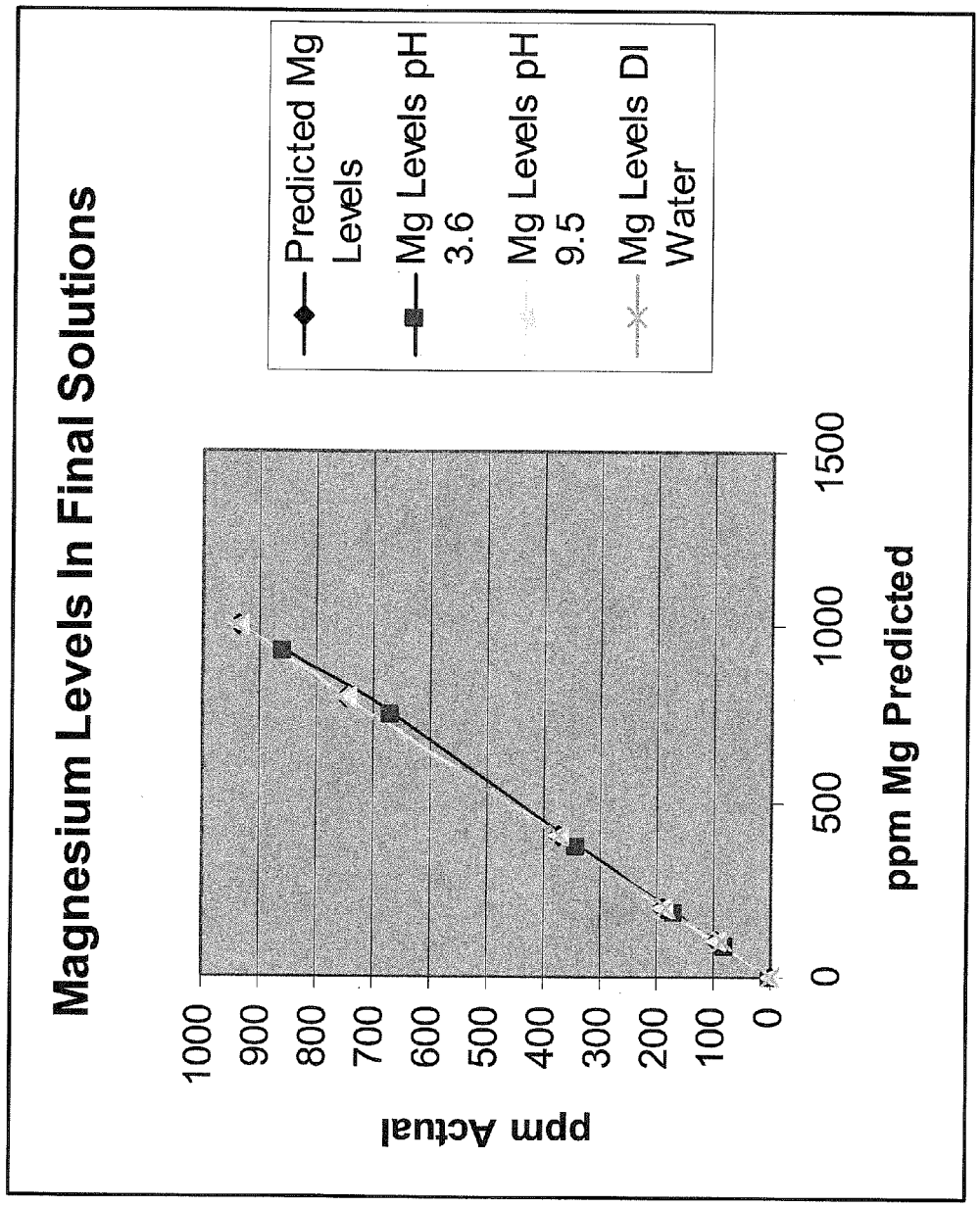
FIG. 4 is a graphical depiction of the actual concentration of magnesium ions in solution compared to the predicted concentration of magnesium ions in solution using antiscalant aqueous solutions of the present invention at varying levels of pH.

As can also be seen in Table 4, the actual levels of magnesium ions in solution were also comparable to the predicted levels of magnesium ions in solution. This is also graphically depicted in FIG. 4. This indicates that the magnesium ions were not replacing the calcium ions to precipitate out magnesium Example 5

Calcium Carbonate Inhibition Test

Stock solutions of a 0.1 molar sodium carbonate solution and a 0.1 molar calcium chloride solution were first prepared. The sodium carbonate solution was prepared by mixing about 10.6 grams of sodium carbonate with deionized water to a final volume of one liter. The calcium chloride solution was prepared by mixing about 14.23 grams of calcium chloride with deionized water to a final volume of about one liter. The solutions were stirred for about 30 minutes.

The stock magnesium chloride solution was prepared by first adding about 10.456 grams of $MgCl_2 \cdot 6H_2O$ to a one liter flask. Deionized water was then added such that there was a total of about 1000 grams of a 1250 ppm stock magnesium solution. The 1250 ppm stock magnesium solution was stirred for about 30 minutes. Various antiscalant aqueous solutions were then prepared from the 1250 ppm stock magnesium solution. To prepare an antiscalant aqueous composition comprising about 100 ppm magnesium ion (Composition 33), about 270 milliliters (ml) of deionized water was added to about 30 ml of the 1250 ppm stock magnesium solution; to prepare an antiscalant aqueous composition comprising about 200 ppm magnesium ion (Composition 34), about 240 milliliters of deionized water was added to about 60 ml of the 1250 ppm stock magnesium solution; to prepare an antiscalant aqueous composition comprising about 400 ppm magnesium ion (Composition 35), about 180 milliliters of deionized water was added to about 120 ml of the 1250 ppm stock magnesium solution; to prepare an antiscalant aqueous composition comprising about 800 ppm magnesium ion (Composition 36), about 60 milliliters of deionized water was added to about 240 ml of the 1250 ppm stock magnesium solution; and to prepare an antiscalant aqueous composition comprising about 1000 ppm magnesium ion (Composition 37), no deionized water was added about 300 ml of the 1250 ppm stock magnesium solution. About 80 ml of each of the above magnesium ion compositions were added to 6 beakers.

About 10 ml of each of the ammonium oxalate and calcium chloride stock solutions were then pre-measured and added to each of the antiscalant aqueous compositions while simultaneously stirring. The compositions were stirred for about 2 minutes and allowed to sit for about 20 minutes in order to allow the precipitate to settle. A syringe was then used to pull off about 50 ml samples of the compositions. The samples were then filtered through a 0.45 micron filter and submitted for analysis by ICP for calcium and magnesium in the compositions.

In addition to measuring the concentration of calcium ions present in the resulting composition, the pH levels of the antiscalant aqueous compositions before the addition of the calcium chloride solution and sodium carbonate solution and after the addition of calcium chloride solution and sodium carbonate solution were also measured. An increase in the pH of the composition indicates an increase of carbonate ions in solution. As the level of carbonate ions in solution increases, it is assumed that the level of calcium ions in solution also increases.

Figure 5:
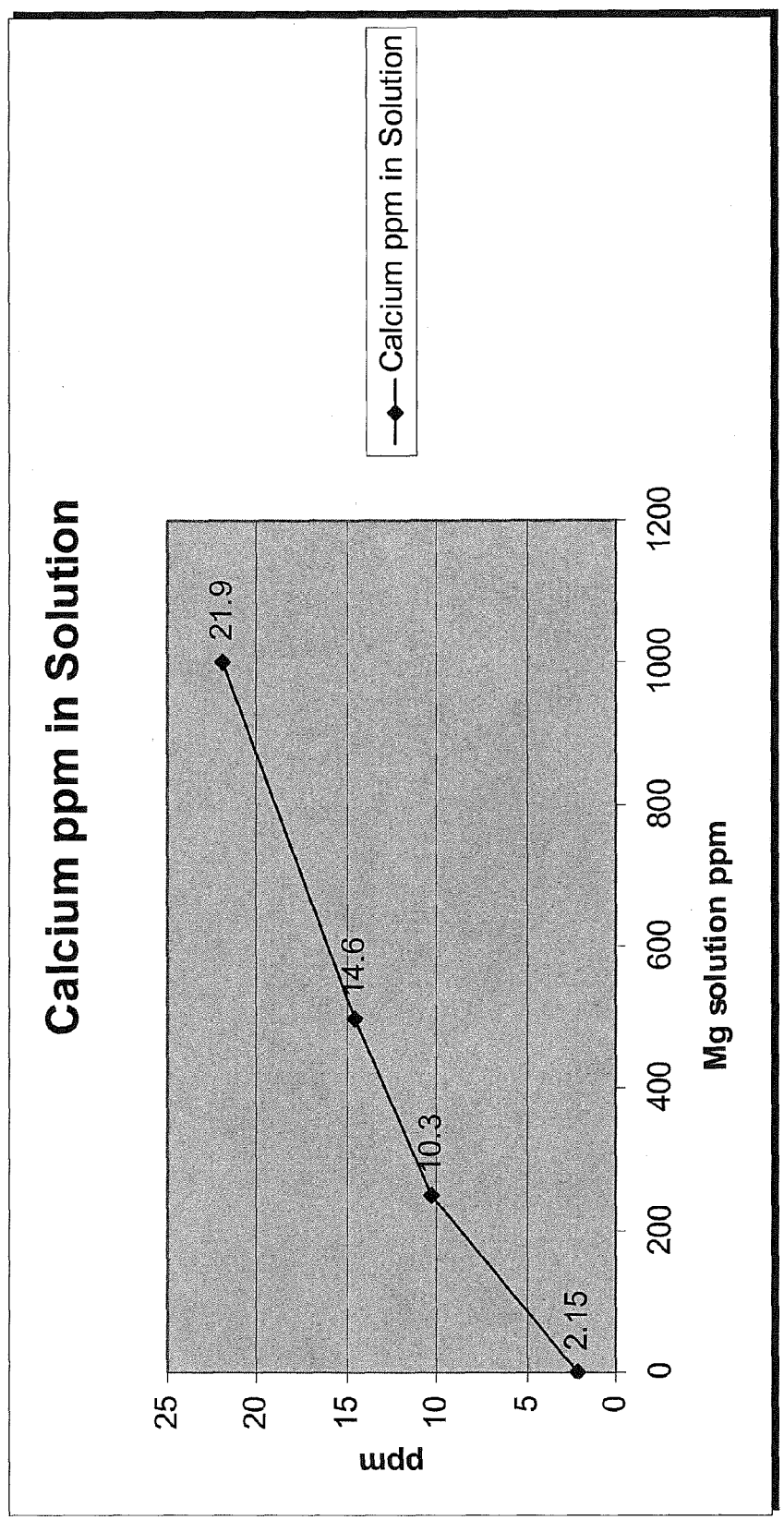
FIG. 5 is a graphical depiction of the concentration of calcium ions in solution versus the concentration of magnesium ions included in the antiscalant solution as described in Example 6.

The initial concentration of magnesium ions in the antiscalant aqueous compositions, the resulting concentration of calcium ions and magnesium ions, the mole ratio of calcium ions to magnesium ions deficit, the initial pH of the composition, the final pH of the composition, and any observations are shown in Table 5. These results are also graphically depicted in FIG. 5.

TABLE 5

| Composition | Calcium Salt Inhibitor (ppm) | Ca++ (ppm) | Mg++ (ppm) | Mole ratio of Ca++ to Mg++ deficit | pH Start | pH Final | Observations |
|---|---|---|---|---|---|---|---|
| Control | 0 | 18.8 | 0 | N/A | 8.1 | 9.09 | Precipitate stuck to bottom of beaker most |
| Composition 33 | 100 | 44.6 | 76.5 | 1.14 | 7.3 | 9.1 | Precipitate stuck to bottom of beaker mid |

TABLE 5-continued

| Composition | Calcium Salt Inhibitor (ppm) | $Ca^{++}$ (ppm) | $Mg^{++}$ (ppm) | Mole ratio of $Ca^{++}$ to $Mg^{++}$ deficit | pH Start | pH Final | Observations |
|---|---|---|---|---|---|---|---|
| Composition 34 | 200 | 53.8 | 170 | 1.08 | 6.95 | 9.38 | Precipitate stuck to bottom of beaker slight |
| Composition 35 | 400 | 81.5 | 347 | 0.92 | 6.54 | 10.06 | Loose precipitate |
| Composition 36 | 800 | 238 | 734 | 2.57 | 6.19 | 9.96 | Loose precipitate |
| Composition 37 | 1000 | 314 | 918 | 2.30 | 5.98 | 10 | Loose precipitate |

As can be seen from the data in Table 5, there is a relationship between the concentration of magnesium ions in the antiscalant composition and the amount of calcium carbonate precipitation. In particular, as the level of magnesium ions in solution increased, the level of calcium ions in solution also increased. This indicates that higher levels of magnesium ions resulted in less precipitation of calcium carbonate. Thus, the level of calcium carbonate precipitated into solution decreased with the addition of magnesium ions.

The pH levels of the initial and final compositions provide further evidence that carbonate ions were present in the final compositions and that the amount of carbonate ions present in the final compositions increased as the level of magnesium ions in solution increased. The pH of the compositions generally increased by a greater percentage as the amount of magnesium ions in the initial antiscalant composition increased. This indicates that the amount of carbonate ions, and thus calcium ions, in solution increased with increasing levels of magnesium ions. As the concentrations of calcium ions and carbonate ions in solution increase, the amount of calcium ions and carbonate ions available to form a salt and precipitate into solution decreases. Thus, less calcium carbonate precipitated in solution with increased levels of magnesium ions.

As also shown in the last column of Table 5, at higher levels of magnesium ions, there was less calcium carbonate that precipitated into solution. In particular, at a concentration of about 400 ppm, the compositions resulted in a loose precipitate that did not stick to the bottom of the beaker. At concentrations of less than about 400 ppm, the compositions had varying levels of calcium carbonate precipitate stuck to the bottom of the beaker.

Example 6

Calcium Oxalate Solubility Test

Stock solutions of a 0.1 molar ammonium oxalate solution and a 0.1 molar calcium chloride solution were first prepared. The ammonium oxalate solution was prepared by mixing about 14.21 grams of ammonium oxalate with deionized water to a final volume of one liter. The calcium chloride solution was prepared by mixing about 14.23 grams of calcium chloride with deionized water to a final volume of about one liter. The solutions were stirred for about 30 minutes and covered. About 250 ml of each solution was poured into a beaker and stirred for about 10 minutes. The solutions were then allowed to sit to allow any precipitate to settle. The liquid was decanted and the precipitate was filtered and washed with deionized water. The precipitate was then filtered and dried overnight in an oven at about 85° C.

To prepare an antiscalant aqueous composition comprising about having about 250 ppm of magnesium ions (Composition 38), about 0.1673 grams of $MgCl_2.6H_2O$ was added to about 80 ml of deionized water; to prepare an antiscalant aqueous composition comprising about 500 ppm of magnesium ions (Composition 39), about 0.3346 grams of $MgCl_2.6H_2O$ was added to about 80 ml of deionized water; and to prepare an antiscalant aqueous composition comprising about 1000 ppm of magnesium ions (Composition 40), about 0.6692 grams of $MgCl_2.6H_2O$ was added to about 80 ml of deionized water.

About 0.1 grams of dry calcium oxalate were added to each composition and stirred for about 20 minutes at room temperature. The mixtures were then allowed to settle for about 10 minutes. A syringe was then used to pull off about 50 ml samples of the compositions. The samples were then filtered through a 0.45 micron filter and submitted for analysis by ICP for calcium and magnesium in the compositions.

The concentrations of magnesium ion in the initial antiscalant aqueous compositions, the resulting concentrations of calcium ions and magnesium ions, the magnesium ion deficit, and the mole ratio of calcium ions to magnesium ions deficit are shown in Table 6. The amount of calcium (ppm) in solution versus the concentration of magnesium added (ppm) is also graphically depicted in FIG. 6. It was assumed that the presence of calcium ions in solution were evidence of oxalate ions in solution as well.

TABLE 6

| Composition | $Mg^{++}$ (ppm) | $Ca^{++}$ (ppm) | $Mg^{++}$ deficit (ppm) | Mole ratio of $Ca^{++}$ to $Mg^{++}$ deficit |
|---|---|---|---|---|
| Control | 0 | 2.15 | 0 | 0 |
| Composition 19 | 236 | 10.3 | 14 | 2.24 |
| Composition 20 | 477 | 14.6 | 23 | 2.59 |
| Composition 21 | 946 | 21.9 | 54 | 4.06 |

As shown in Table 6, the solubility of calcium oxalate increases as the level of magnesium ions in solution increases. The concentration of calcium ions in solution indicates that at least some of the calcium oxalate that was present in solution dissolved into calcium ions and oxalate ions. The higher the level of calcium ions, the less calcium oxalate precipitated into solution. The fact that the concentration of calcium ions increased as concentration of magnesium ions increased showed that the presence of magnesium ions contributed to the solubility of calcium oxalate.

Example 7

Evaluation of Calcium Carbonate Scale Inhibition Using Mg

A laboratory scale stainless steel heat exchange coil shall be used to simulate heat exchange surfaces in dairy processing equipment. Whey UF permeate from a cheese production plant will be circulated through the inside of a stainless steel coiled tube. Steam heat will be applied to the outside of the coil so that the temperature of the outgoing whey permeate is about 40-50 degrees Fahrenheit higher than the incoming whey permeate. The heated solution will be discharged into a sump with a cooling jacket. The intake for the pump shall be in this sump.

The solution will be circulated for 4-6 hours, and rinsed by pumping 1 gallon of deionized water through the coil. The solution will then be drained.

The coil will be cleaned with 2 liters of 10% Nitric Acid solution for 1 hour. The Calcium, Magnesium and Phosphorus content of the acid solution before and after cleaning will be analyzed. This will give the quantity of scale deposited into the coil.

Multiple runs of this experiment with and without Magnesium salts added to the solution will be performed. The amount scale deposited between treated and non-treated runs will be compared.

Other Embodiments

It is to be understood that while the invention has been described in conjunction with the detailed description thereof, the foregoing description is intended to illustrate, and not limit the scope of the invention, which is defined by the scope of the appended claims. Other aspects, advantages, and modifications are within the scope of the following claims.

In addition, the contents of all patent publications discussed supra are incorporated in their entirety by this reference.

It is to be understood that wherever values and ranges are provided herein, all values and ranges encompassed by these values and ranges, are meant to be encompassed within the scope of the present invention. Moreover, all values that fall within these ranges, as well as the upper or lower limits of a range of values, are also contemplated by the present application.

We claim:

1. A method for preventing scale formation on industrial food processing equipment used to process a liquid food source, the method comprising:

applying an antiscalant aqueous solution consisting of about 50 ppm to about 150 ppm of a water soluble source of magnesium ion to the equipment, wherein the water soluble source of magnesium ion is selected from the group consisting of magnesium chloride, magnesium sulfate, magnesium acetate, and mixtures thereof wherein the antiscalant solution is applied to the equipment by at least one of direct injection into the liquid food source prior to evaporation and direct injection in the process lines of the equipment prior to evaporation, and the scale comprises a calcium salt selected from the group consisting of calcium phosphate, calcium oxalate, calcium silicate and mixtures thereof, such that the formation of scale on the equipment is substantially prevented.

2. The method of claim 1, wherein the antiscalant aqueous solution consists of about 100 ppm of the water soluble source of magnesium ion.

3. The method of claim 1, wherein the food processing equipment is selected from the group consisting of an evaporator, equipment used in an ultra high temperature pasteurization process, and equipment used in a high temperature short time pasteurization process.

4. The method of claim 1, wherein the liquid food source is selected from the group consisting of milk, whey, whey permeate, juice, calcium fortified beverages, sugar, corn wet-milling steeping liquour, and mixtures thereof.

5. The method of claim 4, wherein the juice is a juice subjected to an evaporation process.

6. The method of claim 5, wherein the juice is selected from the group consisting of tomato juice, and carrot juice.

7. The method of claim 1, wherein the liquid food source is a fuel ethanol process stream selected from the group consisting of corn, sugar, and mixtures thereof.

8. The method of claim 1, wherein the magnesium ion is a food grade version.

* * * * *